United States Patent [19]

McCabe

[11] Patent Number: 5,271,464
[45] Date of Patent: Dec. 21, 1993

[54] TEMPORARY PLUGGING AGENT

[75] Inventor: Michael A. McCabe, Duncan, Okla.

[73] Assignee: Halliburton Company, Duncan, Okla.

[21] Appl. No.: 970,347

[22] Filed: Nov. 2, 1992

[51] Int. Cl.$^5$ ............................................... E21B 33/13
[52] U.S. Cl. .................................... 166/295; 252/8.552
[58] Field of Search ............... 166/292, 293, 294, 295; 252/8.552

[56] References Cited

U.S. PATENT DOCUMENTS 3,613,788 10/1971 Kautsky ........................ 252/8.552 X
3,619,427 11/1971 Kautsky ........................ 252/8.552 X Primary Examiner—William P. Neuder
Attorney, Agent, or Firm—Robert A. Kent

[57] ABSTRACT

The present invention provides a method of temporarily plugging or sealing a subterranean formation by introducing a rapidly viscosifying liquid hydrocarbon into the formation. The method is accomplished by admixing a first component comprising an alkyl orthophosphate acid ester and an alkali metal hydroxide present in an amount sufficient to at least partially neutralize said ester and a second component comprising an amine complex resulting from the reaction of an aqueous source of aluminum or ferric ions and a $C_8$-$C_{18}$ surface active amine in the presence of a water miscible organic solvent with the liquid hydrocarbon. The mixture rapidly viscosifies to a level sufficient to temporarily plug or seal a subterranean formation or wellbore into which it is introduced.

19 Claims, No Drawings

TEMPORARY PLUGGING AGENT

BACKGROUND OF THE INVENTION

1. Field Of The Invention

The present invention relates to a method and composition for temporarily plugging a wellbore or subterranean formation

2. Prior Art

The performance of remedial treatments on producing oil and gas wells require a method of effecting well control or zonal isolation. Methods of well control include such means as weighted fluids, mechanical devices such as packers, bridge plugs or mechanical diverters, cement plugs and aqueous polymer gel plugs.

The aqueous polymer gel plugs offer an alternative to the mechanical devices and may be more economical or practical than a mechanical device in many instances. The polymer gel plugs use water soluble polymers dispersed as a colloidal, aqueous solution to temporarily plug or seal a permeable zone or formation adjacent to a wellbore or form a plug in the wellbore. The water soluble polymers typically are high molecular weight natural polysaccharides such as guar gum, derivatized guars and derivatized cellulose. When the polysaccharides hydrate, they form viscous gels.

In certain instances it may be necessary to create a temporary plug in a formation which is subject to significant damage when contacted by an aqueous fluid or which might be damaged by the residue remaining after treatment with an aqueous gel. In such a situation it would be desirable to effect plugging with a non-aqueous fluid such as a hydrocarbon that could be caused to viscosify. It would also be desirable to minimize any residue present after the treatment that could damage formation permeability.

SUMMARY OF THE INVENTION

The discovery now has been made that a hydrocarbon fluid can be rapidly viscosified by the method hereinafter described to rapidly form a temporary plug or seal in a subterranean formation or wellbore. The hydrocarbon is viscosified by the reaction of two components which are admixed with the hydrocarbon. The first component comprises an alkylorthophosphate acid ester which is admixed with a quantity of an alkali metal hydroxide to effect partial neutralization of the acid ester. The second component is an oil soluble amine complex resulting from the reaction of an alcohol or water soluble source of aluminum or ferric ions with a quantity of a $C_{8-18}$ alkyl or alkanol amines, N-heterocyclic amines, alkyl substituted derivatives of such a heterocyclic amine and mixtures thereof in the presence of a $C_2$–$C_4$ monohydric alcohol or other water miscible organic solvent capable of solubilizing the reaction mixture. The reaction results in the formation of an oil soluble aluminum or ferric amine complex. A hydrocarbon is gelled to form a high viscosity plug in a wellbore or formation by admixing a quantity of the first and second components with a quantity of a hydrocarbon fluid such as diesel, crude oil or another refined crude oil product. The mixture is pumped into the wellbore or formation to be temporarily sealed whereupon it rapidly develops sufficient viscosity to plug the wellbore or formation.

DESCRIPTION OF THE PREFERRED EMBODIMENT

In accordance with the present invention, a novel gelling system is provided which can viscosify a hydrocarbon to a viscosity of at least about 4000 centipoise in less than about 30 seconds as measured by a Brookfield ® Synchrolectric Viscometer Model LTV, using a #3 spindle rotating at 12 rpm at ambient temperature when added at a concentration of 0.5% by volume. The liquid hydrocarbons that can be gelled by the present invention include crude oil, and derivatives thereof such as kerosene, diesel, gasoline and other aliphatic or aromatic hydrocarbons such as octane, heptane, lubricating oils and the like. The hydrocarbon is gelled by the addition of two components to the liquid hydrocarbon while the liquid is mixed o otherwise agitated. The first component comprises an alkyl orthophosphate acid ester which is admixed with a quantity of an alkali metal hydroxide whereby the ester is partially neutralized. The alkyl orthophosphate esters are characterized according to the formula:

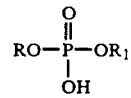

wherein R is an alkyl radical having from about 6 to 18 carbon atoms and $R_1$ is an alkyl having from about 2 to 4 carbon atoms. The orthophosphate also may comprise a mixture of different compounds. Preferably R has an average value of from about 8 to 10 carbon atoms and $R_1$ is ethyl. The alkylorthophosphate ester may be prepared by any of the well known methods, such as those disclosed in U.S. Pat. No. 3,757,864, which is incorporated herein by reference. Such compounds are available from manufactures such as Witco Chemical Company, Houston Tex.; Nalco Chemical Company, Sugar Land Tex.; Petrolite Corporation, St Louis Mo.; Ethox Chemicals Inc. Greenville S.C.; Rhone-Poulenc, Cranbury N.J. and Borg-Warner Corporation, Chicago Ill.

The alkali metal hydroxide can comprise lithium, sodium, potassium and the like. Preferably, the alkali metal is potassium. The alkali metal hydroxide is admixed with the alkyl orthophosphate ester in an amount sufficient to at least partially neutralize the ester. The alkali metal hydroxide is admixed with the ester in an amount of from about 5 to about 30% by weight. The alkali metal hydroxide is admixed with the ester in an amount sufficient to adjust the pH of the final two component mixture of gelling agent in the hydrocarbon to a level of from about 3.5 to about 6.5. The pH of the gelled hydrocarbon mixture is determined by ASTM STANDARD D664-8.

The second component of the gelling agent is prepared by reacting an alcohol or water soluble source of aluminum or ferric ions or an admixture thereof, such as aluminum chloride or ferric sulfate, with a $C_8$–$C_{18}$ surface active amine and, for example, a $C_2$–$C_4$ monohydric alcohol.

The surface active amine employed in the second component includes alkyl and alkanol amines having from about 8-18 carbon atoms, N-heterocyclic amines, alkyl substituted derivatives of such heterocyclics and mixtures thereof. Preferably, amines having more than 1 nitrogen group are utilized and most preferably the amine comprises an imidazoline such as that prepared from the reaction of a tall oil fatty acid with diethylenetriamine.

The monohydric alcohol preferably comprises isopropanol, however, ethanol or butanol also can be utilized as well as mixtures of the above. The alcohol functions to solubilize the mixture of the constituents to permit the reaction to occur. It should be understood that acetone or any other water miscible organic solvent capable of solubilizing the mixture, also could be utilized to solubilize the mixture.

The source of aluminum or ferric ions is present in an amount of from about 40 to about 70% by weight of the final product. The amine is present in an amount of from about 10 to about 30% by weight of the final product. The alcohol is present in an amount of from about 5% to about 30% by weight of the final product. Preferably, the ion source is present in an amount of from about 60 to about 70% and the amine is present in an amount of from about 10 to about 20% and the alcohol is present in an amount of from about 10 to about 30% of the final product. The constituents are permitted to react for a period of at least about 2 hours whereby an oil soluble amine complex is formed. The reaction may be effected at atmospheric or super atmospheric pressure and at a temperature of from about ambient to about 80° C.

The first component is admixed with the second component in a ratio of from about 1:0.75 to about 1:1.75 by volume. Preferably, the first component is admixed with the second component in a ratio of from about 1:0.75 to about 1:1.25.

The first component and second component may be admixed with the hydrocarbon liquid in any order or substantially simultaneously. The admixing may occur in substantially any of the conventionally known mixing apparatus or blenders. The total amount of the first and second components used to viscosify a hydrocarbon generally is in a range of from about 30 to 100 gallons per 1000 gallons of hydrocarbon.

Surprisingly, it has been found that the method of the present invention can effect gelation of the hydrocarbon in a matter of a few seconds after both components have been added to the hydrocarbon. The hydrocarbon typically develops a viscosity in excess of about 4000 centipoise within about 30 seconds after admixing with the gelling system as determined on a Brookfield ® Model LTV viscometer utilizing a No. 3 spindle rotating at 12 rpm at ambient temperature at a concentration of 0.5% volume. It should be understood that the novel constituents of the present invention also can be utilized to prepare viscosified hydrocarbon fluids in batch processes in addition to the substantially continuous process described herein. The techniques required for batch processing are well known to individuals of any skill in the art. The rapid nature of the hydrocarbon gelation is believed to result from the oil soluble nature of the amine complex.

The gelled hydrocarbon thus formed may be broken, if desired, by the addition of substantially any of the conventionally known breakers for gelled oils to thereby return the viscosity of the gelled hydrocarbon liquid to a level at least 50 percent less than its gelled viscosity at the conclusion of the treatment. Examples of breakers include various organic acids such as acetic acids, salts of such acids, caustic and the like. The amount of breaker employed will vary depending on such parameters as the temperature of the gelled fluid at the time breaking is desired, original viscosity of the gelled fluid, exact salt and orthophosphate esters employed, the concentration of the orthophosphate ester and the like.

Other types of fluid additives such as surfactants, corrosion inhibitors, and the like well known in the art, also can be added to the gelled hydrocarbon fluid.

After thorough blending of any additives with the gelled hydrocarbon fluid, the gel is pumped into a wellbore where it is ultimately caused to viscosify or to enter the subterranean formation which is to be plugged.

To further illustrate the present invention and not by way of limitation, the following example is provided.

EXAMPLE

The gelation rate of kerosene by the compositions of the present invention is compared to that achieved by prior art compositions. The gelation rate is evaluated by the time required to effect vortex closure in a quantity of kerosene within a Waring Blendor. The Waring Blendor jar is provided with a Polytron Rotor Stator, Waring Blendor attachment and 250 ml. of kerosene is placed in the jar for each test. The speed of the blender is adjusted to the maximum agitation that could be achieved while minimizing air entrainment which is approximately 3450 rpm. The same speed setting is used for all tests. The quantities of the constituents are set forth in the table below. The phosphate ester first component is added to the jar followed immediately by the second component. The second component was prepared using either aluminum or ferric ion sources as set forth below.

The composition of the components was as follows:

| First Component: | |
|---|---|
| $C_8-C_{18}$ orthophosphate di-ester | 15 gm |
| 45% KOH | 4.5 gm |
| Second Component: when Al used Amine complex reaction product resulting from reaction of: | |
| a) 32° Baume $AlCl_3$ | 50 gm |
| b) imidazoline | 12 gm |
| c) isopropyl alcohol | 10 gm |
| Second Component: when Fe used Amine complex reaction product resulting from reaction of: | |
| a) ferric sulfate liquid (10% $Fe^3$) | 50 gm |
| b) imidazoline | 12 gm |
| c) water | 5 gm |
| d) isopropyl alcohol | 10 gm |

The prior art composition comprised the following:
First Component—$C_8-C_{10}$ orthophosphate di-ester
Second Component—aqueous sodium aluminate solution
(20% by weight $Na_2 Al_2 O_4$). This composition corresponds to the conventional gellants disclosed on page 60 of the American Chemical Society Symposium Series 396 entitled "Oilfield Chemistry," copyright 1989. The composition is utilized at a concentration to provide the ratio of 100 moles of ester to 33 moles of aluminate described in the AC publication.

TABLE

| Test No. | Concentration, First Component gal/1000 gal of hydrocarbon | Second Component Al gal/1000 gal | Second Component Fe gal/1000 gal | Vortex Closure Time, Seconds |
|---|---|---|---|---|
| 1 | 8 | 6 | | 25 |
| 2 | 8 | 8 | | 6 |
| 3 | 8 | | 6 | 12 |
| 4 | 8 | | 8 | 10 |
| 5* | 8 | 2.5 | | >120 |

*prior art composition

The data set forth above clearly illustrates the rapid rate at which the compositions of the present invention achieve gelation of a hydrocarbon liquid in comparison to prior art techniques.

As will be apparent to those skilled in the art, various changes may be made in the compositions and methods described herein without departing from the spirit or scope of the invention set forth in the appended claims.

What is claimed is:

1. A method of temporarily plugging or sealing a subterranean formation penetrated by a wellbore comprising:
   introducing into said wellbore an admixture of a liquid hydrocarbon with a gelling effective amount of a first component comprising an admixture of an alkyl orthophosphate acid ester and an alkali metal hydroxide whereby said ester is at least partially neutralized and a second component comprising a reaction product comprising an oil soluble amine complex produced by the reaction of an aqueous soluble source of aluminum or ferric ions and a $C_8$-$C_{18}$ surface active amine in a water miscible organic solvent; and temporarily plugging or sealing said formation upon gelation of said admixture in said wellbore.

2. The method of claim 1 wherein said alkali metal hydroxide is potassium hydroxide and said surface active amine is imidazoline 3. The method of claim 1 wherein said first component is admixed with said second component in a ratio of from about 1:0.75 to about 1:1.75.

4. The method of claim 1 wherein the total amount of said first and second components admixed with said liquid hydrocarbon is in the range of from about 30 to about 100 gallons per 1000 gallons of said hydrocarbon.

5. A method of temporarily plugging or sealing a subterranean formation by rapidly viscosifying a hydrocarbon liquid placed therein comprising:
   mixing a liquid hydrocarbon with a viscosifying effective amount of a first component comprising an admixture of an orthophosphate ester having the general formula

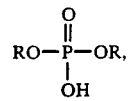

wherein R is $C_6$ to $C_{18}$ and $R_1$ is an alkyl radical of from $C_2$-$C_4$ and an alkali metal hydroxide and a second component comprising an oil soluble amine complex resulting from the reaction of an aqueous soluble source of aluminum or ferric ions and a $C_8$-$C_{18}$ surface active amine in the presence of a $C_2$-$C_4$ monohydric alcohol whereby said mixture is caused to rapidly viscosify; and
   introducing said mixture into a portion of a subterranean formation whereby said portion of said formation is caused to be temporarily plugged.

6. The method of claim 5 wherein R of said first component has an average value of from about 8 to 10 and $R_1$ is ethyl.

7. The method of claim 5 wherein said alkali metal hydroxide is potassium hydroxide.

8. The method of claim 5 wherein said source of aluminum ions comprises aluminum chloride.

9. The method of claim 5 wherein said $C_8$-$C_{18}$ surface active amine comprises at least one member selected from the group of $C_8$-$C_{18}$ alkyl or alkanol amines, N-heterocyclic amines and alkyl substituted derivatives of such heterocyclic amines.

10. The method of claim 5 wherein said surface active amine is imidazoline.

11. The method of claim 10 wherein said imidazoline is prepared from the reaction of a tall oil fatty acid with diethylenetriamine.

12. The method of claim 5 wherein said first component is admixed with said second component in a ratio of from about 1:0.75 to about 1:1.75.

13. The method of claim 5 wherein said mixture of first and second component is present in said liquid hydrocarbon in an amount of from about 30 to about 100 gallons per 1000 gallons.

14. The method of claim 5 wherein said alkali metal hydroxide is present in said first component in an amount sufficient to adjust the pH of said gelled hydrocarbon to a level in the range of from about 3.5 to 6.5.

15. The method of claim 5 wherein said source of aluminum or ferric ions is admixed in an amount sufficient to constitute from about 40 to about 70% by weight of the final product.

16. The method of claim 5 wherein said surface active amine is admixed in an amount sufficient to constitute from about 10 to about 30% by weight of the final product.

17. The method of claim 5 wherein said alkali metal hydroxide is admixed with said ester in an amount of from about 5 to about 30% by weight.

18. The method of claim 5 wherein said source of ferric ions is iron sulfate.

19. The method of claim 5 wherein the first or second component is admixed in portions with said liquid hydrocarbon, the total quantity of said portions being sufficient to total said effective amount of said component necessary to effect viscosification.

* * * * *